United States Patent
Abdul et al.

(10) Patent No.: US 8,245,233 B2
(45) Date of Patent: Aug. 14, 2012

(54) SELECTION OF A REDUNDANT CONTROLLER BASED ON RESOURCE VIEW

(75) Inventors: Anis M. Abdul, Austin, TX (US); Brent William Jacobs, Rochester, MN (US); Ajay Kumar Mahajan, Austin, TX (US); Atit D. Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 12/335,690

(22) Filed: Dec. 16, 2008

(65) Prior Publication Data

US 2010/0153679 A1  Jun. 17, 2010

(51) Int. Cl.
G06F 9/46 (2006.01)
(52) U.S. Cl. ........................................ 718/103
(58) Field of Classification Search .................. 718/103
See application file for complete search history.

(56) References Cited

U.S. PATENT DOCUMENTS

| | | | |
|---|---|---|---|
| 6,671,776 B1 * | 12/2003 | DeKoning | 711/114 |
| 6,886,107 B2 | 4/2005 | Walsh et al. | |
| 7,000,088 B1 * | 2/2006 | Rudeseal et al. | 711/173 |
| 2003/0115443 A1 * | 6/2003 | Cepulis et al. | 713/2 |
| 2004/0181647 A1 | 9/2004 | DeSota et al. | |
| 2006/0174051 A1 | 8/2006 | Lordi et al. | |
| 2007/0174601 A1 | 7/2007 | Douglas et al. | |
| 2007/0240016 A1 * | 10/2007 | Anderson et al. | 714/11 |
| 2007/0250183 A1 | 10/2007 | Howell et al. | |
| 2007/0261052 A1 | 11/2007 | Bale et al. | |
| 2008/0022148 A1 | 1/2008 | Barnea et al. | |
| 2008/0034366 A1 * | 2/2008 | Tanaka et al. | 718/1 |

* cited by examiner

*Primary Examiner* — Thomas Lee
*Assistant Examiner* — Wissam Rashid
(74) *Attorney, Agent, or Firm* — Yudell Isidore Ng Russell PLLC

(57) ABSTRACT

A method, a system and a computer program product for selecting a primary controller for a server system based on the services offered by each controller. A primary controller designator (PCD) utility determines the relative importance of a controller based upon the services provided by the controller and the weighted importance assigned to these services. The PCD utility classifies the services provided by a system-controller according to the following: (1) the number of OS partitions a system-controller is able to communicate with; and (2) the number of hardware devices that a controller has access to. The importance of the services is determined by the host OS partition information and the degree of importance of a partition that utilizes/requires the particular service(s). The PCD utility designates a controller as a "Primary" if the designated "Primary" is capable of providing services that are required for the most important OS partitions, according to the classification of controller services.

18 Claims, 7 Drawing Sheets

Figure 5

| Controller | Processor Connections | I/O Hub Connections | NC Connections | Selected as Primary |
|---|---|---|---|---|
| SC1 | N/A | N/A | NC1, NC2, NC3 | NO |
| SC2 | N/A | N/A | NC1, NC2, NC4 | YES |
| NC1 | CPU1, CPU2 | I/O h1, I/O h2 | N/A | YES |
| NC2 | CPU1, CPU2 | I/O h1, I/O h2 | N/A | NO |
| NC3 | CPU3 | I/O h3, I/O h4 | N/A | NO |
| NC4 | CPU4 | I/O h3, I/O 4 | N/A | YES |

500

504
506
508
512

SELECTION OF A REDUNDANT CONTROLLER BASED ON RESOURCE VIEW

BACKGROUND

1. Technical Field

The present invention generally relates to multi-processor systems and in particular to controllers in multi-processor systems.

2. Description of the Related Art

The system control structure of conventional server systems is made up of two levels of redundant system controllers. The purpose of these redundant system controllers is to boot the system. Once the system has booted up, these system-controllers provide reliability, availability and serviceability (RAS) services. One of the system-controllers in each redundant pair is assigned a "Primary" role. The "Primary" system-controller has the responsibility of executing an Initial Program Load (IPL) of the system and providing the RAS services.

Conventional systems do not differentiate between a fully functioning and a partially functioning system-controller. These conventional systems do not use the services provided by a partially functioning system-controller. As a result, conventional systems do not benefit from an increased system capability that may be achieved from the collective service capability of both system controllers within a redundant pair.

SUMMARY OF ILLUSTRATIVE EMBODIMENTS

Disclosed are a method, a system and a computer program product for selecting a primary controller for a server system based on the services offered by each controller. A primary controller designator (PCD) utility determines the relative importance of a controller based upon the services provided by the controller and the weighted importance assigned to these services. The PCD utility classifies the services provided by a system-controller according to the following: (1) the number of OS partitions a system-controller is able to communicate with; and (2) the number of hardware devices that a controller has access to. The importance of the services is determined by the host OS partition information and the degree of importance of a partition that utilizes/requires the particular service(s). The PCD utility designates a controller as a "Primary" if the designated "Primary" is capable of providing services that are required for the most important OS partitions, according to the classification of controller services.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein:

FIG. 5 is another example table illustrating controller connectivity, according to one embodiment of the invention;

DETAILED DESCRIPTION OF AN ILLUSTRATIVE EMBODIMENT

Figure 1:
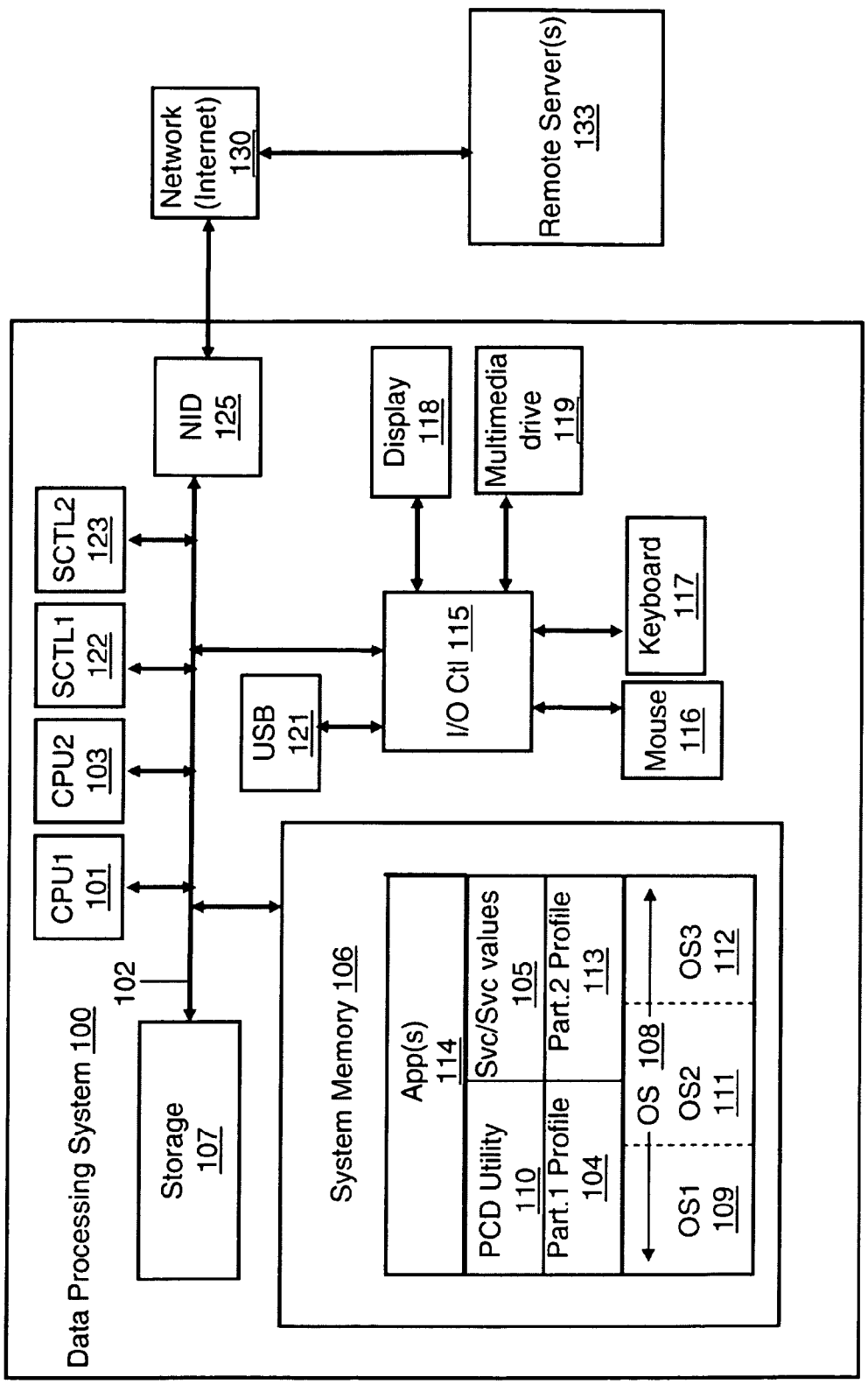
FIG. 1 provides a block diagram representation of a data processing system within which the invention is practiced, according to one embodiment of the invention.

The illustrative embodiments provide a method, a system and a computer program product for selecting a primary controller for a server system based on the services offered by each controller. A primary controller designator (PCD) utility determines the relative importance of a controller based upon the services provided by the controller and the weighted importance assigned to these services. The PCD utility classifies the services provided by a system-controller according to the following: (1) the number of OS partitions a system-controller is able to communicate with; and (2) the number of hardware devices that a controller has access to. The importance of the services is determined by the host OS partition information and the degree of importance of a partition that utilizes/requires the particular service(s). The PCD utility designates a controller as a "Primary" if the designated "Primary" is capable of providing services that are required for the most important OS partitions, according to the classification of controller services.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and beginning with FIG. 1, there is depicted a block diagram representation of an example data processing system (DPS), as utilized within one embodiment. DPS may be a computer and/or other type of electronic devices that may generally be considered processing devices. As illustrated, DPS 100 comprises at least one processor or central processing units (CPUs) connected to system memory 106 via system interconnect/bus 102. In particular, CPU1 101 and CPU2 103 (i.e., a first and second processor/processor core) are illustrated. In addition, a pair of system controllers, Controller1 122 and Controller2 123 are connected to system bus 102. Also connected to system bus 102 is Input/output (I/O) controller 115, which provides connectivity and control for input devices, of which pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 121 are illustrated, coupled to I/O controller 115. Multimedia drive 119 and USB port 121 enable insertion of a removable storage device (e.g., optical disk or "thumb" drive) on which data/instructions/code may be stored and/or from which data/instructions/code may be retrieved. DPS 100 also comprises storage 107, within/from which data/instructions/code may also be stored/retrieved.

DPS 100 is also illustrated with a network interface device (NID) 125, by which DPS 100 may connect to one or more access/external networks 130, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 125 may be configured to operate via wired/or wireless connection to an access point of the network. Network 130 may be an external network such as the Internet or wide area network (WAN), or an internal network such as an Ethernet (local area network—LAN) or a Virtual Private Network (VPN). Connection to the external network 130 may be established with one or more servers 133, which may also provide data/instructions/code for execution on DPS 100, in one embodiment.

In addition to the above described hardware components of DPS 100, various features of the invention are completed/supported via software (or firmware) code or logic stored within memory 106 or other storage (e.g., storage 107) and executed by CPU1 101 and/or CPU2 103. Thus, for example, illustrated within memory 106 are a number of software/firmware/logic components, including one or more operating systems (OS) 108 (e.g., Microsoft Windows®, a trademark of Microsoft Corp, or GNU®/Linux®, registered trademarks of the Free Software Foundation and The Linux Mark Institute), applications 114, Partition Information 104, Controller Services and service values (file) 105 and primary controller designator (PCD) utility 110. In one embodiment, PCD utility 110 is executed on a system controller (e.g., Controller1 122 or Controller2 123) which is designated as a temporary (default) primary controller during the process to determine one or more primary controllers. Since the primary system and node controllers are designated prior to initializing the host CPUs (e.g., 101, 103), the temporary primary is utilized in stand alone systems which are unable to utilize system controller services accessible from a server network. However, in another embodiment, primary controller designator (PCD) utility 110 may be executed on one or more processors of a separate server connecting to (server) DPS 100 when PCD utility is in the process of determining the corresponding primary controllers. Illustrated within OS 108 are a number of OS types including OS1 109, OS2 111 and OS3 112. In one embodiment, PCD utility 110 utilizes partitioning technology by which DPS 100 is capable of running different operating systems (e.g., OS1 109 and OS2 111) in a processor device, such as DPS 100, equipped with multiple processor cores. By utilizing partition profiles (e.g., partition1 profile 104 and partition2 profile 113), DPS 100 determines the allocation of resources to a particular partition. For simplicity, PCD utility 110 is illustrated and described as a stand alone or separate software/firmware component, which provides specific functions, as described below.

In one embodiment, servers 133 includes a software deploying server, and DPS 100 communicates with the software deploying server (133) via network (e.g., Internet 130) using network interface device 125. Then, the PCD utility 110 may be deployed from/on the network, via software deploying server 133. With this configuration, software deploying server performs all of the functions associated with the execution of PCD utility 110. Accordingly, DPS 100 is not required to utilize internal computing resources of DPS 100 to execute PCD utility 110.

CPU 101 executes PCD utility 110 as well as OS 108, which supports the user interface features of PCD utility 110. Certain functions supported and/or implemented by PCD utility provide processing logic which are executed by processor and/or device hardware to complete the implementation of specific functions supported by PCD utility 110. For simplicity of the description, the collective body of code that enables these various functions is referred to herein as PCD utility 110. Among the software code/instructions/logic provided by PCD utility 110, and which are specific to the invention, are: (a) code/logic for classifying services provided by a controller; (b) code/logic for determining a relative importance of redundant controllers; and (c) code/logic for selecting a primary controller based on the relative importance of one or more redundant controllers. According to the illustrative embodiment, when CPU 101 executes PCD utility 110, DPS 100 initiates a series of functional processes that enable the above functional features as well as additional features/functionality. These features/functionality are described in greater detail below within the description of FIGS. 2-7.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM i/p-series p6 High-End system, a product of International Business Machines Corporation in Armonk, N.Y., running the Advanced Interactive Executive (AIX) operating system or LINUX operating system.

Figure 2:
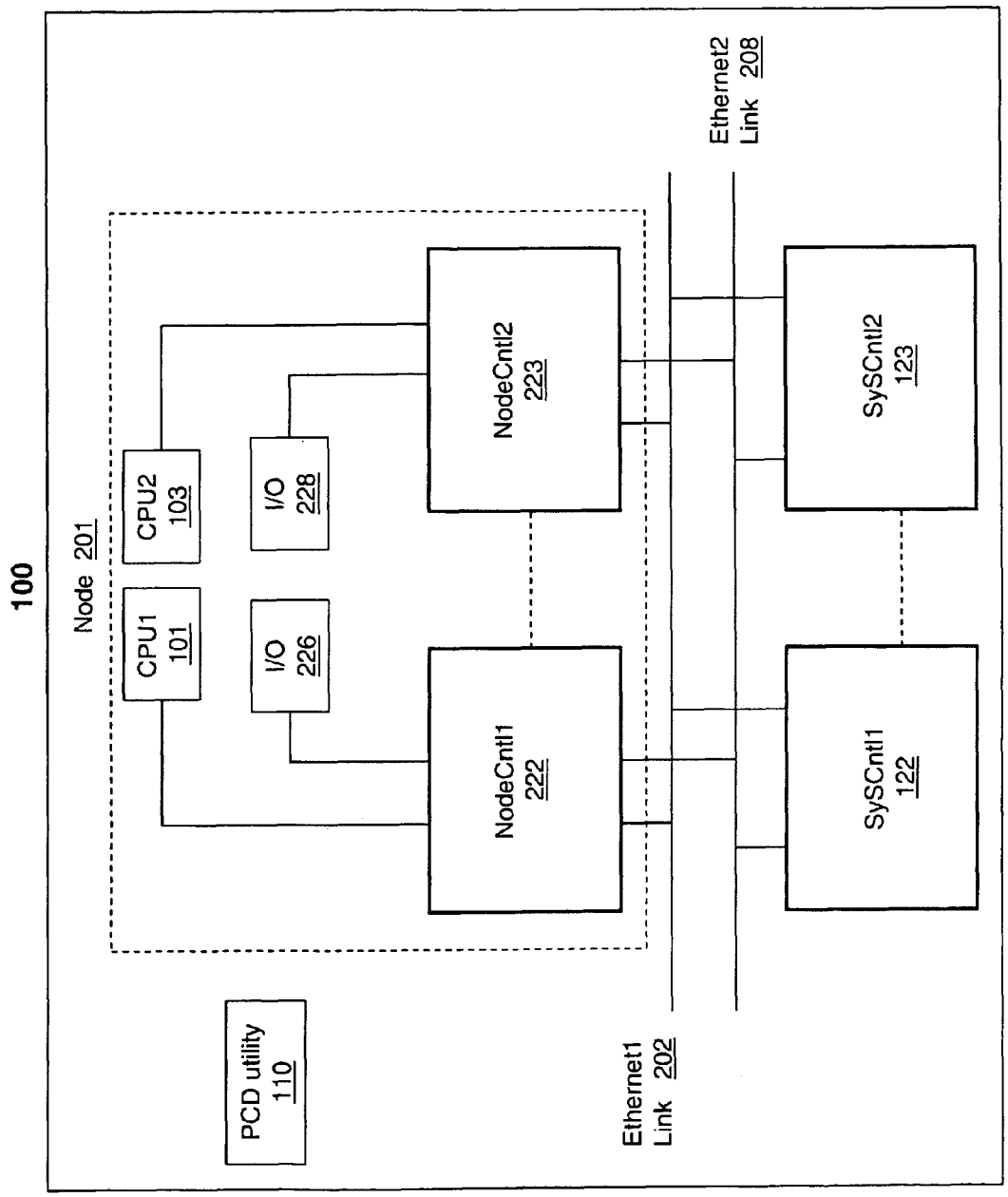
FIG. 2 illustrates a System Control Structure (SCS) of a data processing system, in accordance with one embodiment of the invention.

With reference now to FIG. 2, a System Control Structure (SCS) of a data processing system (DPS) is illustrated, according to one embodiment of the invention. The system control structure is a representation of a management tree which provides a hierarchical view of controllers and the associated accessible resources. DPS 100 comprises multiple levels of redundant controllers. A first level of redundant controllers include system controllers (SCs) 122 and 123 which aggregate control across the entire system 100. Comprising a second level of redundant controllers are node controllers (NCs) 222 and 223 which control access within system/node 201. In node 201, node controller1 222 is coupled to I/O device 226 and CPU1 101. Node controller2 223 is coupled to I/O device 228 and CPU2 103. SCs and NCs in DPS 100 communicate using redundant ethernet networks (respectively illustrated as Ethernet1 Link 202 and Ethernet2 Link 208).

Starting at the node-controller (NC) level (illustrated within node 201), which is closest to the end devices, PCD utility 110 determines/identifies the set/view of end devices with which each NC is able to communicate. In particular, node controller1 222 is able to communicate with I/O device 226 and CPU1 101. Node controller2 223 is able to communicate with I/O device 228 and CPU2 103. PCD utility 110 compares the sets (of accessible end devices including processors, memory, I/O hubs, etc.). A set (also referred to as a "view") of accessible end devices corresponding to a node controller is compared with other sets/"views" of accessible end devices corresponding to other node controllers. If these sets are equal, or one set is a subset of the other set, PCD utility 110 may determine a primary NC based on a preset group of controller related factors/characteristics. However, if these sets are not equal, or one set is not a subset of the other set, PCD utility 110 determines that the NCs do not offer similar hardware services. Consequently, PCD utility 110 performs a comparison to determine which NC is able to satisfy the requirements of the highest priority partition. If both NCs (e.g., node controller1 222 and node controller2 223) are able to satisfy the highest priority partition, the NC hardware sets/views are then compared for the next highest priority partition. The level of priority of a partition is based upon the importance of the workload running within the partition and may be recorded in an associated policy file. In one embodiment, a comparison is (sequentially) performed at various levels of partition priority until only one NC is able to satisfy the requirements of the respective partition (at the particular level of partition priority). Ultimately, the NC which is able to communicate with end devices for the highest priority partitions is chosen as the primary NC.

A similar comparison is performed at the system controller (SC) level after a primary controller is chosen at the NC level. Due to assymetric faults in the network, it is possible for both SCs (SC1 122 and SC2 123) to have a different view of the NCs. The "Primary" SC is generally capable of communicating with the highest priority OS partition. For example, PCD utility 110 may select/designate SC1 122 as the Primary system controller. The accessible end devices and the NCs with which each SC is able to communicate are also taken into consideration when determining the primary SC.

In one embodiment, a system controller which provides fewer services may be selected as "Primary" if the system controller is able to provide services that are required for the most important OS partitions. PCD utility 110 may extend the approach to selecting a primary controller to controllers that attach to processors, memory, and I/O hubs, and even I/O controllers which attach to DASD or communications networks.

Figure 3:
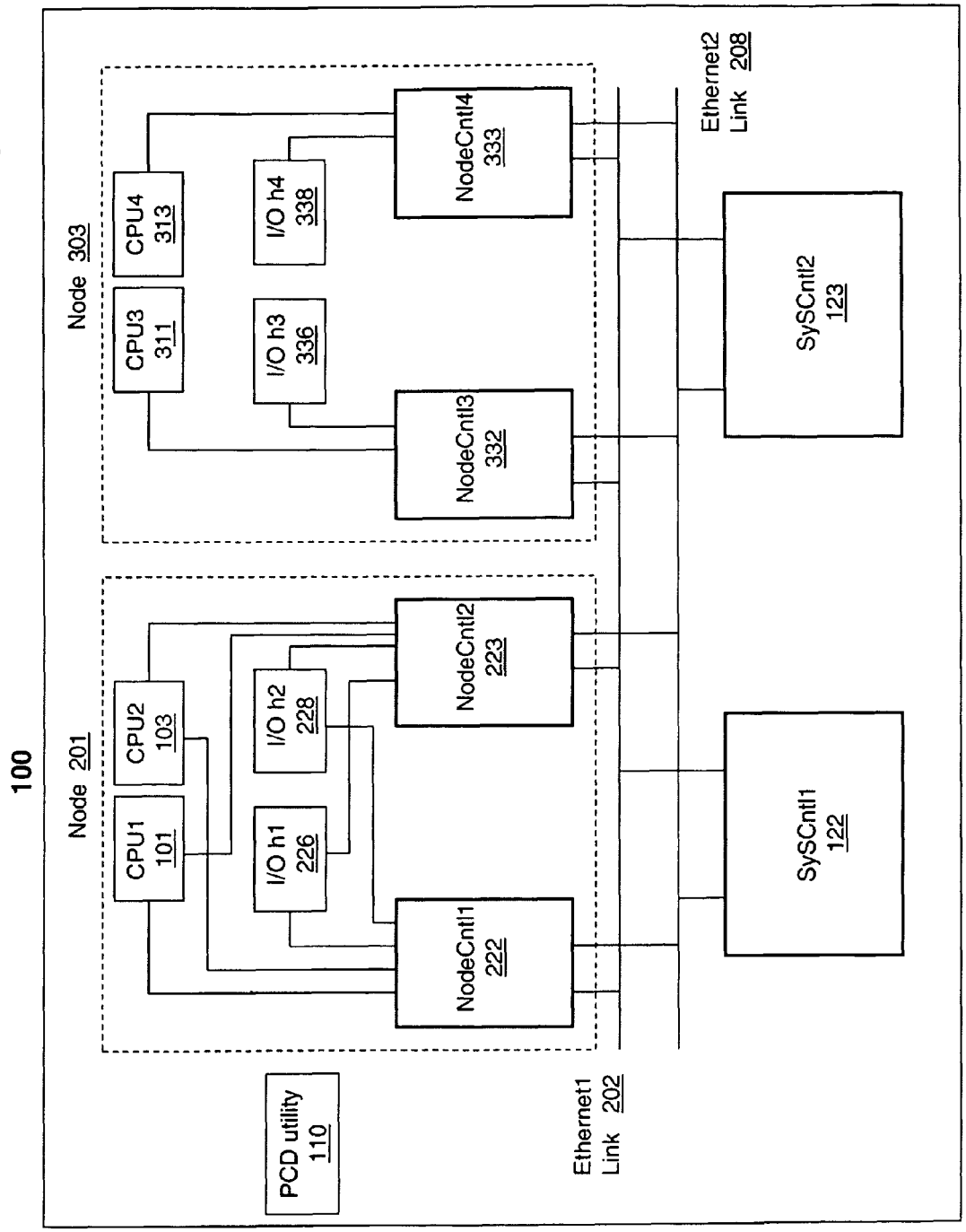
FIG. 3 illustrates a block diagram of a data processing system with multiple levels of redundant system management controllers, according to one embodiment of the invention.

FIG. 3 illustrates a block diagram of a data processing system with multiple levels of redundant controllers, according to one embodiment of the invention. The redundant system controllers (SCs) 122 and 123 aggregate control across the entire system 100. Redundant node controllers (NCs) 222 and 223 control access within first system node 201. Similarly, redundant NCs 332 and 333 control access within second system node 303. In particular, NCs 222 and 223 can only communicate with Processors 101 and 103 and I/O hubs 226 and 228 within node 201. NCs 332 and 333 can only communicate with Processors 311 and 313 and I/O hubs 336 and 338 within node 303. SCs 122 and 123 can directly communicate with NCs 222, 223 and NCs 332 and 333 via ethernet 202 and/or 208. Thus, SCs 122 and 123 can communicate with any NC in either node 201 or 303.

From among the pair of redundant system controllers 122 and 123, a primary system controller is selected. In node 201, a primary node controller is selected from among redundant NCs 222 and 223. Similarly, in node 303, a primary node controller is selected from among redundant NCs 332 and 333. A primary node controller performs the hardware accesses to initialize the processors, I/O hubs and other components in the associated node. The primary system controller supports/"instructs" the primary node controller in each node in initializing the components within the associated node. In addition, the primary system controller supports the primary node controllers with regards to other system management functions.

Because each pair of redundant NCs (NCs 222 and 223 of a first pair and NCs 332 and 333 of a second pair) has the pair's own associated connection to an end device (such as Processors 101, 103 and processors 311 and 313, respectively), failures in one or more of these connections may cause NCs in a redundant pair to have a different view of the available processors. In addition, because SCs 122 and 123 coordinate such actions as a system initial program load (IPL), requiring them to communicate with at least one of the NCs (at least one from NCs 222 and 223 of the first pair and at least one from NCs 332 and 333 of the second pair) in each of (the respective) node 201 and node 303. The SCs may also have different views of the system if one of the SCs is unable to communicate with both of the NCs in a node. If only one of the SCs or NCs in a redundant pair has a degraded view, then the controller with a relatively good view is selected (by elimination of the controller with a degraded view in the selection process) as the primary controller. When the controllers in a redundant pair have dissimilar degraded views, then the selection process becomes more difficult, and may also depend on the view of controllers at all levels in the management tree. In the management tree, NCs are at a lower level than SCs.

To determine the primary controller in a redundant pair of controllers in which the controllers have dissimilar degraded views of the hardware, PCD utility 110 determines which controller has the more important view of the system. In particular, PCD utility 110 determines the system hardware upon which each operating system partition has a dependency. PCD utility 110 then determines the order of importance of each of the operating system partitions.

Figure 6:
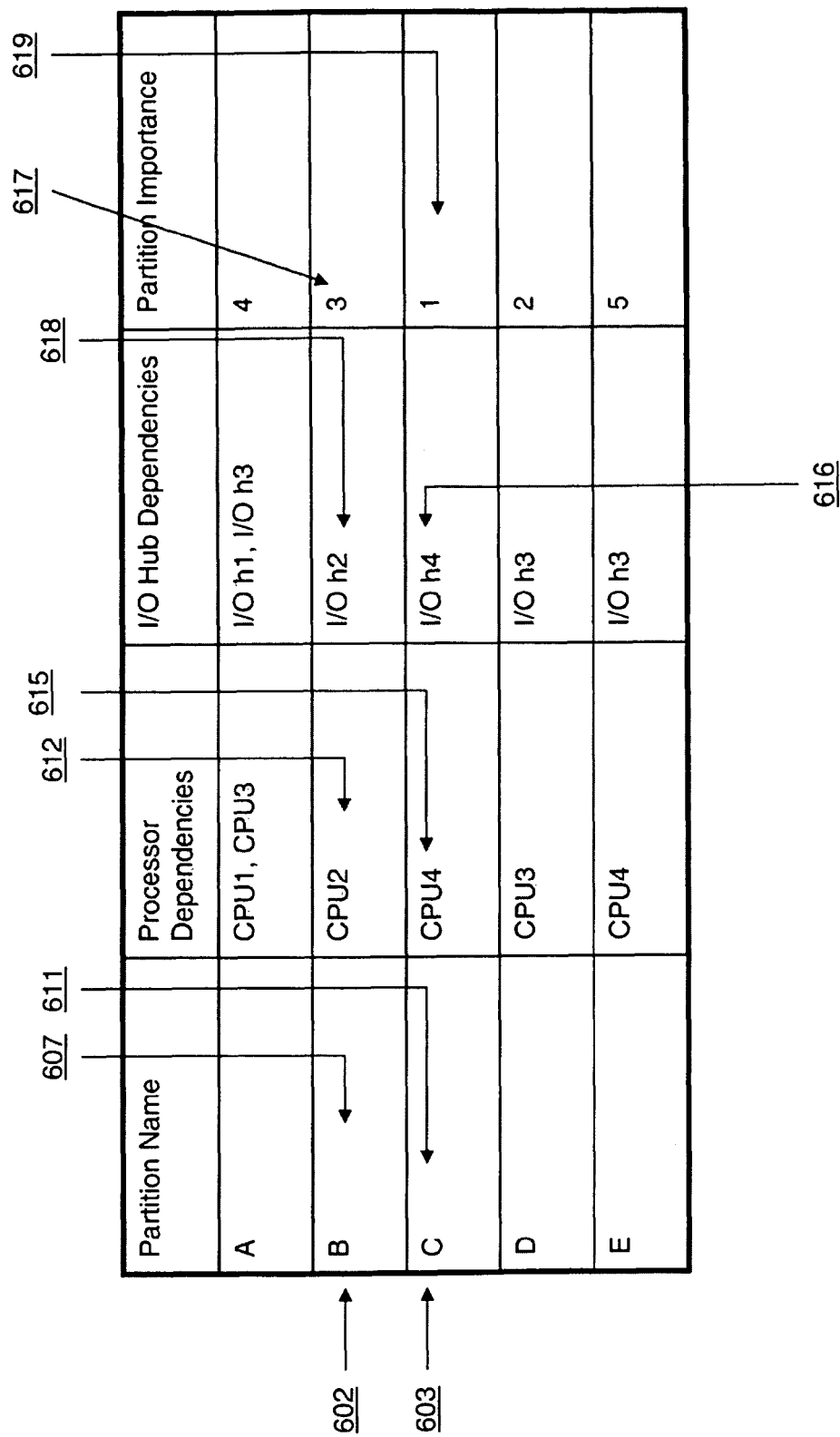
FIG. 6 is a second example table illustrating relative importance of a set of partitions and the corresponding hardware dependencies, according to one embodiment of the invention.

In order to facilitate an explanation of the process of selecting a primary controller, two examples (for DPS 100 of FIG. 3) are utilized and discussed with reference to the tables presented by FIGS. 4-6. In these examples, partitions, hardware dependencies, and corresponding importance are defined in a respective table.

Figure 4:
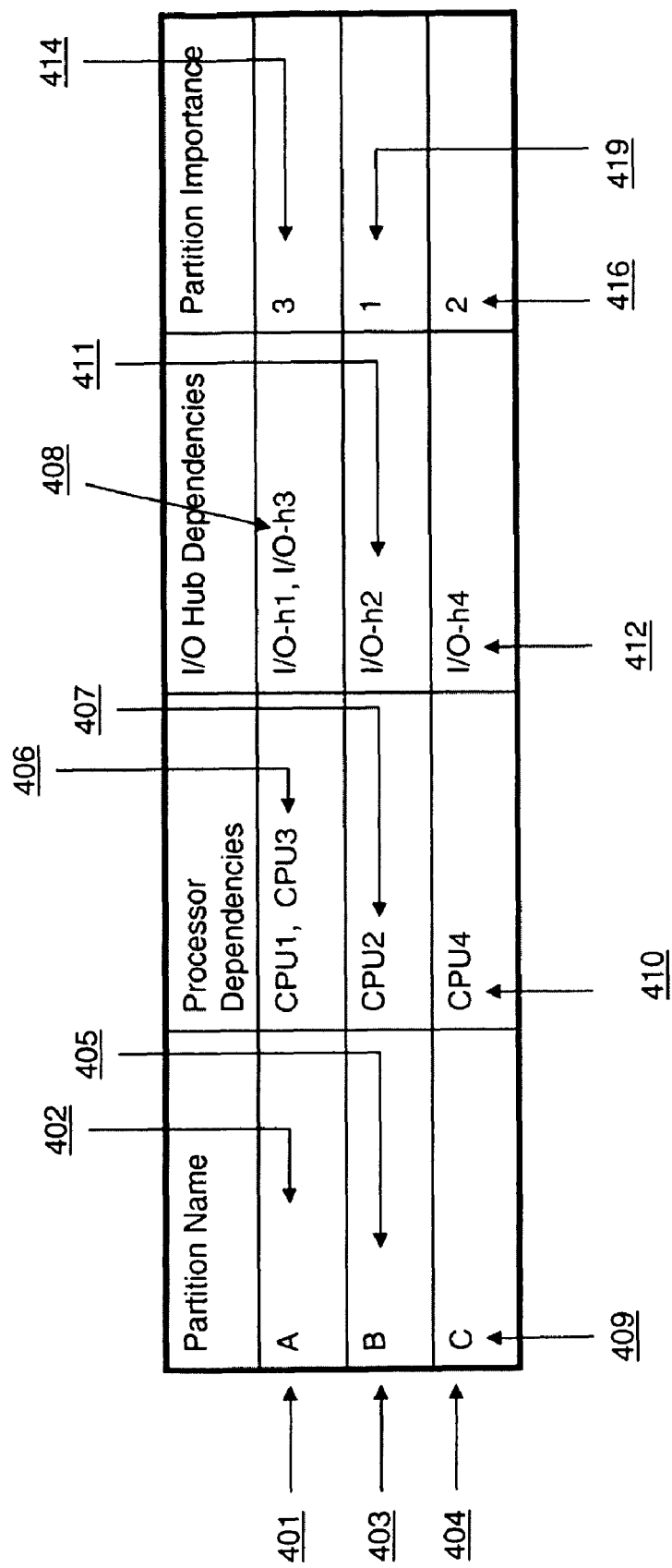
FIG. 4 is a first example table illustrating relative importance of a set of partitions and the corresponding hardware dependencies, according to one embodiment of the invention.

FIG. 4 is a first example table illustrating relative importance of a set of partitions and the corresponding hardware dependencies, according to one embodiment of the invention. Similarly, FIG. 6 is a second example table illustrating relative importance of a set of partitions and the corresponding hardware dependencies, according to one embodiment of the invention. FIG. 5 is an example table illustrating controller connectivity, according to one embodiment of the invention. FIG. 5 is applicable in both examples illustrated in FIGS. 4 and 6.

Table 400 identifies the partition dependencies of partitions within corresponding rows of Table 400. For example, first row 401 provides (a list of) dependencies of partition A 402 including first processor dependencies (PD) 406 (in the second column), first I/O hub dependencies (HD) 408 (in the third column) and respective partition importance illustrated as A-importance 414 (in the fourth column). Second row 403 provides dependencies of partition B 405 including second processor dependencies (PD) 407 (in the second column), second I/O hub dependencies (HD) 411 (in the third column) and respective partition importance illustrated as B-importance 419 (in the fourth column). Third row 404 provides dependencies of partition C 409 including third processor dependencies 410 (in the second column), third I/O hub dependencies (HD) 412 (in the third column) and respective partition importance illustrated as C-importance 416 (in the fourth column).

According to the (first) example of Table 400, partition B 405 (is the most important partition and) has a partition importance of "1" as illustrated by B-importance 419. In Table 400, second PD 407 indicates that operation of partition B 405 requires CPU2 103. Second I/O HD 411 indicates that partition B 405 requires I/O 228. A review of the connections for CPU2 103 and I/O hub 228 indicates (via Table 500 and via DPS 100 of FIGS. 2, 3) that NC 222 and NC 223 both fulfill the dependencies (i.e., second processor dependency (PD) 407 and second I/O hub dependency (HD) 411) of partition B 405.

Table 500 summarizes the specific controller and end device connections of a particular controller. For example, row 504, row 506 and row 508 provide connections for SC2 123, NC1 222 and NC2 223, respectively. Row 506 and row 508 indicate identical connections for NC1 222 and NC2 223. Thus, PCD utility 110 may select either NC 222 or NC 223 as the "primary". PCD utility 110 arbitrarily (or based on a preset default assignment to "break a tie") chooses NC 222 as the primary. By a similar review and based on entry 512, for the second most important partition, C 409, only NC 333 fulfills the dependency (i.e., CPU4 313 indicated by third PD 410 and I/O hub4 338 indicated by third I/O HD 412), and NC 333 is chosen as the primary controller for the redundant pair. To fulfill the dependencies of partition A 402, NC 332 and either NC 222 or NC 223 are required as primaries. NC 332 may not be selected as the primary because of the higher priority support provided by the accessibility of NC 332 to dependencies of the higher importance partition C. Therefore, partition A 402 is not capable of being started. In order to meet the requirements of the two most important partitions, B and C, PCD utility 110 requires that the chosen primary SC is able to communicate with (primary) NC 222 and (primary) NC 333. A review of row 504 in Table 500 indicates that only SC 123 has that capability (i.e., to communicate with (primary) NC 222 and (primary) NC 333). Thus, PCD utility 110 selects SC 123 as the primary system controller.

Table 600 identifies the partition dependencies of partitions within corresponding rows of Table 600. For example, first row 602 provides dependencies of partition B 607 including first processor dependencies (PD) 612 (in the second column), first I/O hub dependencies (HD) 618 (in the third column) and respective partition importance illustrated as B-importance 617 (in the fourth column). Second row 603 provides dependencies of partition C 611 including second processor dependencies (PD) 615 (in the second column), second I/O hub dependencies (HD) 616 (in the third column) and respective partition importance illustrated as C-importance 619 (in the fourth column).

According to Table 600, partition C 611 (is the most important partition and) has a partition importance of "1" as illustrated by C-importance 619. Partition C has a dependency on processor 313 and I/O hub 338 (as illustrated by second processor dependency (PD) 615 and second I/O hub dependency (HD) 616, respectively). According to row 512 in Table 500, only NC 333 is connected to both CPU4 313 and I/O hub4 338. Therefore, NC 333 is chosen as the primary node controller. The second most important partition, D, has dependencies on processor 211 and I/O hub 336. These dependencies are met only by NC 332 which has already been designated as a backup to NC 333 (a primary). Therefore, partition D is not capable of being started. Partition B 607 has the dependencies (i.e., CPU2 103 indicated by PD 612 and I/O hub2 228 indicated by I/O HD 618) met by NC 222 or NC 223 (according to rows 506 and 508 of FIG. 5), and PCD utility 110 selects NC 222 as the primary. Partition A requires NC 332 and either NC 222 or NC 223. Since NC 332 has already been designated as a backup, partition A is not capable of being started. Partition E requires NC 333 (which is already selected as the primary node controller). In the example of Table 600, only partitions C, B and E are started. Partitions A and D are not started (i.e., even though some less important partitions are started) because the requirements of the most important partition are not compatible with A and D.

In one embodiment, there are cases in which the primary NC for a node is switched after the primary SC is decided. This switch may occur in the case where only one SC is capable of communicating with the primary NC necessary for the most important partition. If the chosen primary SC is unable to communicate with the primary NC necessary for a lesser important partition, than the primary role in that node may be switched (from the previously selected primary NC) to the sibling NC.

Figure 7:
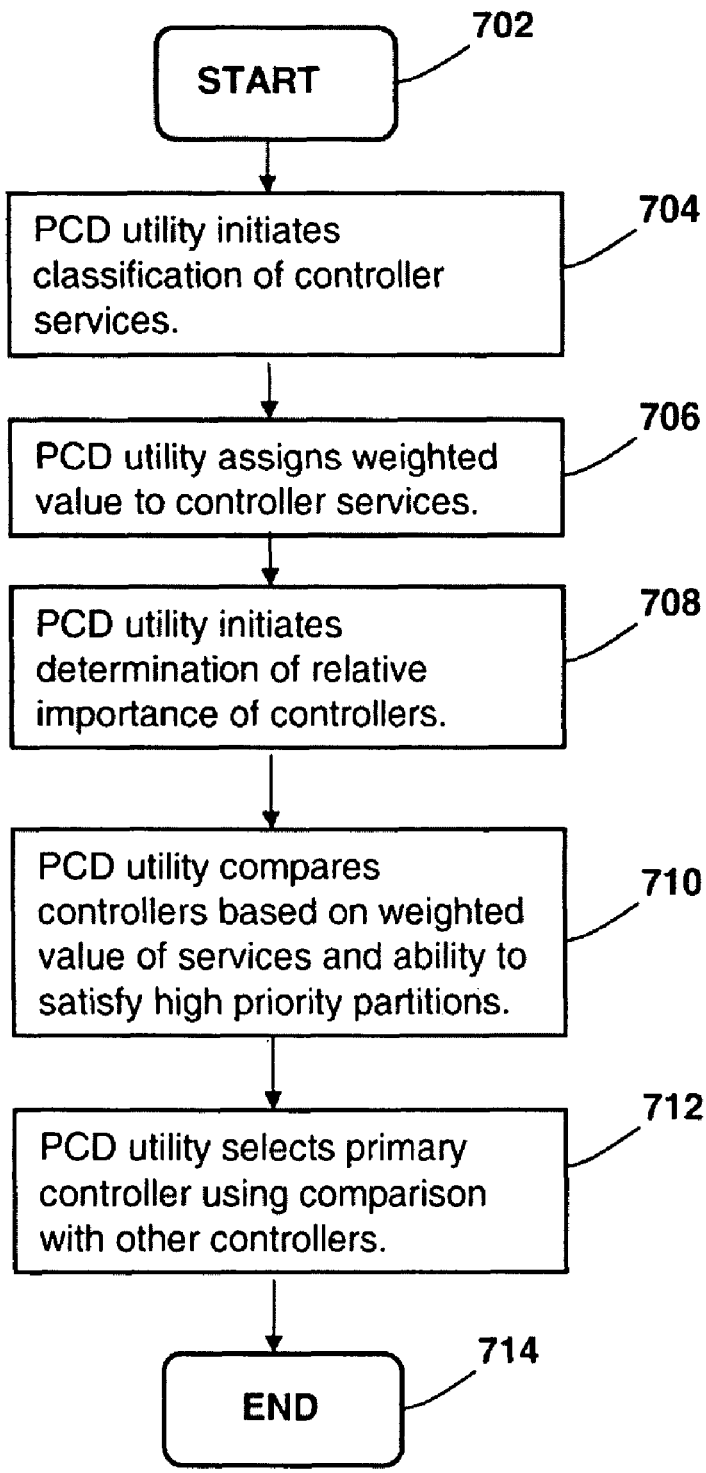
FIG. 7 is a flow chart illustrating the process of selecting a primary controller, according to one embodiment of the invention.

FIG. 7 is a flow chart illustrating the method by which the above processes of the illustrative embodiments are completed. Although the methods illustrated in FIG. 7 may be described with reference to components shown in FIGS. 1-6, it should be understood that this is merely for convenience and alternative components and/or configurations thereof can be employed when implementing the various methods. Key portions of the methods may be completed by PCD utility 110 executing on processor 101 within DPS 100 (FIGS. 1-3) and controlling specific operations of/on DPS 100, and the methods are thus described from the perspective of either/both PCD utility 110 and DPS 100.

The process of FIG. 7 begins at initiator block 702 and proceeds to block 704, at which Primary Controller Designator (PCD) utility 110 initiates a process to classify the services of the redundant controllers at each level of controller operation. At block 706, PCD utility 110 classifies the services provided by a system-controller based upon the following: (a) the number of OS partitions with which a corresponding controller is able to communicate; (b) the number of hardware devices to which the corresponding controller has access; (c) other OS partition information; and (d) respective priority levels of partitions for which the controller service is required. At block 708, PCD utility 110 determines the relative importance of redundant system controllers. At block 710, PCD utility 110 compares redundant controllers at a level of operation based on the following factors/parameters: (a) the associated weighted value of a corresponding controller service; and (b) the ability of redundant controllers to satisfy the highest priority partitions. At each level of operation, a primary controller is identified by PCD utility 110, as shown at block 712. In particular, PCD utility 110 designates a controller as a primary controller when the controller is associated with one or more of: (a) the highest associated weighted value of the corresponding controller service; (b) an exclusive ability of the controller, relative to other redundant controllers, to satisfy a higher priority partition; and (c) an ability of the controller to communicate with controllers at other levels of operation. The process ends at block 714.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order of importance, but rather the terms first, second, etc. are used to distinguish one element from another.

What is claimed is:

1. In a data processing system, a method comprising:
classifying services provided by each of a set of redundant controllers comprising a first controller and a second controller, by:
identifying, for the first controller, a first set of accessible devices and a first number of operating system (OS) partitions with which the first controller can communicate, and
identifying for the second controller, a second set of accessible devices and a second number of OS partitions with which the second controller can communicate,
wherein each of the OS partitions utilizes one or more of the services;
identifying a level of partition priority for each of the OS partitions;
determining, by a computer processor, a relative importance of each of the set of redundant controllers by using the classification of services and the level of partition priority for each of the OS partitions that a respective controller is able to satisfy;
selecting a primary controller from the set of redundant controllers based on a comparison of the relative importance of each of the set of redundant controllers; and
assigning, by the computer processor, the primary controller with management of one or more of: (a) Initial Program Load (IPL) system functions; and (b) reliability, availability and serviceability (RAS) services.

2. The method of claim 1, wherein said classifying services provided further comprises:
assigning a weighted value to collective services of the first controller and collective services of the second controller, based on OS partition information;
wherein the collective services of the first controller comprises each of the services utilized by each of the first number of OS partitions, wherein the collective services of the second controller comprises each of the services utilized by each of the second number of OS partitions, and wherein said OS partition information includes one or more of: (a) an assigned priority level of the partition; (b) types of accessible end devices; and (c) a number of accessible end devices required to start the partition.

3. The method of claim 2, wherein said determining the relative importance further comprises:

comparing each of the set of redundant controllers at a same level of operation based on one or more of: (a) the assigned weighted value of a corresponding controller's collective services; and (b) an ability of each redundant controller to satisfy one or more highest priority partitions.

4. The method of claim 2, wherein said selecting the primary controller further comprises:

assigning a selected controller as a primary controller when the controller is associated with one or more of: (a) a highest associated weighted value of the corresponding controller services; (b) an exclusive ability of the selected controller, relative to other redundant controllers, to satisfy a higher priority partition; and (c) an ability of the selected controller to communicate with controllers at other operating levels.

5. The method of claim 1, wherein said selecting the primary controller further comprises:

selecting the primary controller for one or more of: (a) various levels of operation; and (b) different nodes at the various levels of operation; and in response to a selected primary System Controller (SC) not being able to communicate with a primary Node Controller (NC) required for a lesser important partition, switching the primary role from said primary NC to a sibling NC in a respective node.

6. The method of claim 1, further comprising:

facilitating a boot process in the data processing system using a temporary system controller if the primary controller is not assigned.

7. A data processing system comprising:

one or more processors;

a memory system coupled to the one or more processors;

a utility, stored on the memory system, executed by at least one of the one or more processors to causes the processor to:

classify services provided by each of a set of redundant controllers comprising a first controller and a second controller, by:

identifying, for the first controller, a first set of accessible devices and a first number of operating system (OS) partitions with which the first controller can communicate, and identifying for the second controller, a second set of accessible devices and a second number of OS partitions with which the second controller can communicate, wherein each of the OS partitions utilizes one or more of the services;

identify a level of partition priority for each of the OS partitions;

determine a relative importance of each of the set of redundant controllers by using the classification of services and the level of partition priority for each of the OS partitions that a respective controller is able to satisfy;

select a primary controller from the set of redundant controllers based on a comparison of the relative importance of each of the set of redundant controllers; and assign the primary controller with management of one or more of: (a) Initial Program Load (IPL) system functions; and (b) reliability, availability and serviceability (RAS) services.

8. The data processing system of claim 7, wherein said processor further classifies services provided by:

assigning a weighted value to collective services of the first controller and collective services of the second controller, based on OS partition information;

wherein the collective services of the first controller comprises each of the services utilized by each of the first number of OS partitions, wherein the collective services of the second controller comprises each of the services utilized by each of the second number of OS partitions, and wherein said OS partition information includes one or more of: (a) an assigned priority level of the partition; (b) types of accessible end devices; and (c) a number of accessible end devices required to start the partition.

9. The processing system of claim 8, wherein said processor further determines a relative importance of each of the set of redundant controllers by:

comparing each of the set of redundant controllers at a same level of operation based on one or more of: (a) the assigned weighted value of a corresponding controller's collective services; and (b) an ability of each redundant controller to satisfy one or more highest priority partitions.

10. The processing system of claim 8, wherein said processor further selects the primary controller by:

assigning a selected controller as a primary controller when the controller is associated with one or more of: (a) a highest associated weighted value of the corresponding controller services; (b) an exclusive ability of the selected controller, relative to other redundant controllers, to satisfy a higher priority partition; and (c) an ability of the selected controller to communicate with controllers at other operating levels.

11. The processing system of claim 7, wherein said processor further selects the primary controller by:

selecting the primary controller for one or more of: (a) various levels of operation; and (b) different nodes at the various levels of operation; and in response to a selected primary System Controller (SC) not being able to communicate with a primary Node Controller (NC) required for a lesser important partition, switching the primary role from said primary NC to a sibling NC in a respective node.

12. The processing system of claim 7, wherein the utility further causes the processor to:

facilitate a boot process in a data processing system using a temporary system controller if the primary controller is not assigned.

13. A computer program product comprising:

a tangible computer readable storage device; and program code stored on said computer readable storage device that when executed within a data processing device, said program code provides the functionality of:

classifying services provided by each of a set of redundant controllers comprising a first controller and a second controller, by:

identifying, for the first controller, a first set of accessible devices and a first number of operating system (OS) partitions with which the first controller can communicate, and identifying for the second controller, a second set of accessible devices and a second number of OS partitions with which the second controller can communicate, wherein each of the OS partitions utilizes one or more of the services;

identifying a level of partition priority for each of the OS partitions;

determining, by a computer processor, a relative importance of each of the set of redundant controllers by using the classification of services and the level of partition priority for each of the OS partitions that a respective controller is able to satisfy;

selecting a primary controller from the set of redundant controllers based on a comparison of the relative importance of each of the set of redundant controllers; and assigning, by the computer processor, the primary controller with management of one or more of: (a) Initial Program Load (IPL) system functions; and (b) reliability, availability and serviceability (RAS) services.

14. The computer program product of claim 13, wherein said program code for classifying services provided further comprises program code for:

assigning a weighted value to collective services of the first controller and collective services of the second controller, based on OS partition information;

wherein the collective services of the first controller comprises each of the services utilized by each of the first number of OS partitions, wherein the collective services of the second controller comprises each of the services utilized by each of the second number of OS partitions, and wherein said OS partition information includes one or more of: (a) an assigned priority level of the partition; (b) types of accessible end devices; and (c) a number of accessible end devices required to start the partition.

15. The computer program product of claim 14, wherein said program code for determining the relative importance further comprises program code for:

comparing each of the set of redundant controllers at a same level of operation based on one or more of: (a) the assigned weighted value of a corresponding controller's collective services; and (b) an ability of each redundant controller to satisfy one or more highest priority partitions.

16. The computer program product of claim 14, wherein said program code for selecting the primary controller further comprises program code for:

assigning a selected controller as a primary controller when the controller is associated with one or more of: (a) a highest associated weighted value of the corresponding controller services; (b) an exclusive ability of the selected controller, relative to other redundant controllers, to satisfy a higher priority partition; and (c) an ability of the selected controller to communicate with controllers at other operating levels.

17. The computer program product of claim 13, wherein said program code for selecting the primary controller further comprises program code for:

selecting the primary controller for one or more of: (a) various levels of operation; and (b) different nodes at the various levels of operation; and when in response to a selected primary System Controller (SC) not being able to communicate with a primary Node Controller (NC) required for a lesser important partition, switching the primary role from said primary NC to a sibling NC in a respective node.

18. The computer program product of claim 13, further comprising program code for:

facilitating a boot process in the data processing system using a temporary system controller if the primary controller is not assigned.

* * * * *